Dec. 15, 1953
W. R. WEEKS
2,662,464
SEAL FOR COFFEE MAKERS
Filed June 4, 1949
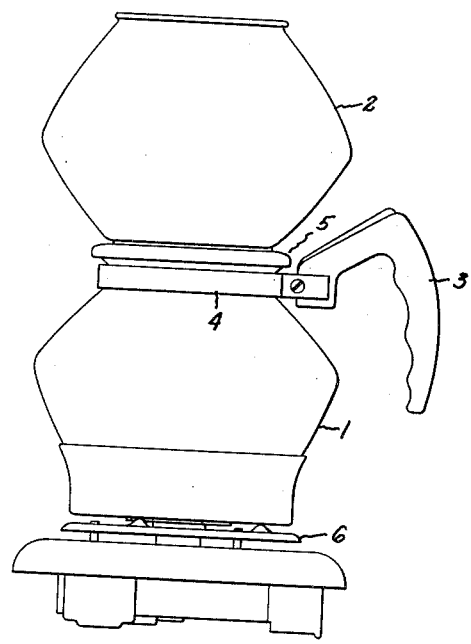
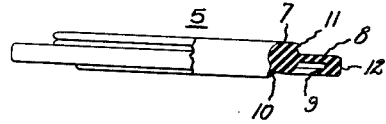
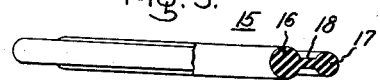
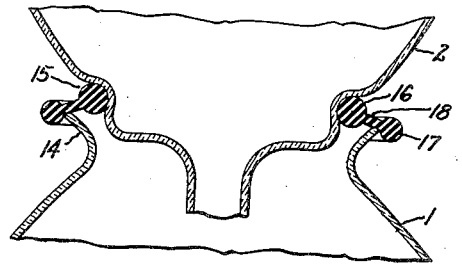
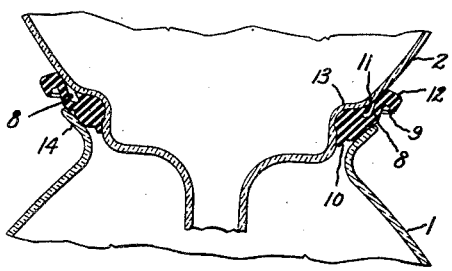
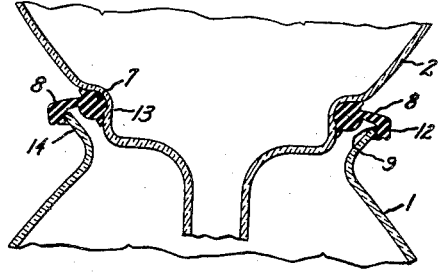
Inventor:
Walter R. Weeks,
by Sheridan le Beggs
His Attorney.

Patented Dec. 15, 1953

2,662,464

UNITED STATES PATENT OFFICE 2,662,464

SEAL FOR COFFEE MAKERS

Walter R. Weeks, Hamden, Conn., assignor to General Electric Company, a corporation of New York Application June 4, 1949, Serial No. 97,175

1 Claim. (Cl. 99—292)

This invention relates to coffee makers of the vacuum type and more particularly to resilient gasket seals between the upper and lower bowls of such coffee makers.

In coffee makers of the vacuum type, having an upper and a lower bowl, with a transfer tube between the two bowls, it is well known that the successful operation of the coffee maker depends upon the maintenance of an air-tight seal at the junction point of the upper and lower bowls. If air is permitted to leak in at the point where the upper and lower bowls fit together, the vacuum effect, which is an essential feature of this type of coffee maker, will be lost. It can be seen, therefore, that the provision of a suitable sealing means between the two bowls is very important.

A satisfactory sealing device for a vacuum-type coffee maker should not only provide an adequate air-tight seal, but should also be so constructed that the seal may be easily positioned and removed. Also, the seal should permit easy separation of the upper and lower bowls.

Furthermore, since the sealing means also usually serves as a support for the upper bowl, a desirable feature in a sealing device for a coffee maker is its ability to maintain the upper and lower bowls in proper alignment with respect to one another; that is, the seal should assure that the upper bowl is maintained in a vertical position, and is not tilted at an angle. This is particularly important where the coffee maker is of the automatic type, such as that disclosed in my Patent 2,287,583, granted June 23, 1942, and assigned to the same assignee as the present application, since the proper functioning of such an automatic coffee maker depends upon the proper alignment of the upper and lower bowls with respect to each other.

This invention relates more specifically to sealing means having the aforementioned desirable qualities for use with coffee makers having a lower bowl of the wide-mouth type. Lower bowls of the wide-mouth type are much more convenient to use than those of the narrow-mouth type, due to the ease with which they may be cleaned.

It is an object of this invention to provide a resilient air-tight seal between the upper and lower bowls of a vacuum-type coffee maker which will adequately maintain the two bowls in properly aligned relation with respect to each other.

It is a further object of this invention to provide a resilient seal between the bowls of a vacuum-type coffee maker which will be easy to position and remove and which will permit easy separation of the upper and lower bowls.

In accomplishment of these objectives, this invention provides a resilient gasket having a toroidal or ring-shaped body which fits into a recess in the lower part of the upper bowl, and a resilient flange integral with the ring body having an outer portion capable of snapping into position over the rim of the lower bowl.

The features of my invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 is a view of the assembled coffee maker including its heating unit; Fig. 2 is a view, partly in cross section, of the improved seal or gasket of this invention; Fig. 3 is a cross-sectional view showing the seal in its unsealed position; Fig. 4 is a cross-sectional view showing the seal in sealing position; and Figs. 5 and 6 are, respectively, a view, partly in cross section, and a view in sealing position of a modified form of my invention.

Referring now to the drawings, Fig. 1 shows an essembled view of the coffee maker comprising a lower bowl 1 having an outwardly-flared open mouth, an upper bowl 2, and a handle 3 attached to band 4 which surrounds the neck of lower bowl 1. The seal or gasket 5 is shown in position between the upper and lower bowls, as will be described later in more detail. The coffee maker is positioned over its heating unit 6.

In Fig. 2, seal 5, which is made of a suitable resilient material such as, for example, rubber, is illustrated as comprising an annular body portion 7 in the shape of a ring or torus surrounded by an integral annular flange or web section 8 which has at its outer edge an inner grooved annular lip 9, which fits over the edge of the lower bowl. Small rib-like extensions 10 and 11 formed integral with the upper and lower surfaces of torus 7 serve to maintain the torus in position and prevent it from rolling on the upper bowl.

The internal diameter of the ring or torus 7 is less than the diameter of the upper bowl at the point where the torus is positioned, shown in Figs. 3 and 4. As a result, the resilient material of the torus must be stretched to the bowl diameter. However, the outer section 12 of the seal tends to remain at its same diameter. This causes the connecting flange section 8 to be forced into a conical shape with the surface of the cone extending either inwardly and downwardly toward the lower bowl, as in Fig. 3, or inwardly and upwardly toward the upper bowl, as in Fig. 4.

Upper bowl 2 with the sealing ring in place, as just described, may be placed in position over lower bowl 1, and the outer flange 8 of the sealing ring may then be pushed downwardly, causing lip 9 to snap into position over the top edge or rim of the lower bowl, as shown in Fig. 4. Once the seal 5 is positioned in this manner, an airtight and steam-tight seal is obtained and the coffee maker is ready for operation, assuming that water has been placed in the lower bowl and coffee in the filter (not shown) in the upper bowl.

It will be noted that when the flange 8 of the sealing ring 5 is snapped downwardly to the position shown in Fig. 4, the upper bowl 2 is raised slightly, due to the flexing of the flange 8. As just explained, when the sealing ring is stretched into position on the upper bowl 2, the flange 8 must assume a conical shape, either pointing upwardly or downwardly, and the height of the upper bowl 2 with respect to the lower bowl 1 differs according to which one of those two conical shapes the flange 8 assumes.

As will be seen in Fig. 4, when the sealing ring 5 is in sealed position, it does not contact the inside surface of the lower bowl at any point. The seal is effected by the close engagement between torus 7 and reentrant bead 13 of the upper bowl, and between lip 9 and the outside edge of the rim of the lower bowl. This construction provides an effective air-tight and steam-tight seal, and provides, at the same time, a seal which can be easily and conveniently removed.

It will also be noted that my sealing ring 5 supports the upper bowl 2 concentrically with lower bowl 1, and prevents the upper bowl from being tipped at an angle with respect to the lower bowl. This is of particular importance when the coffee maker is of the automatic type disclosed in my previously-mentioned Patent 2,287,583, since the proper functioning of such an automatic coffee maker is dependent upon a proper alignment of the automatic components, which in turn requires a proper alignment of the upper and lower bowls.

A further important feature of my sealing ring is the fact that its mode of engagement with the two bowls changes as the coffee-making cycle progresses. After the flange 8 has been manually snapped into position as hereinbefore described, as shown in Fig. 4, and heat is applied to the lower bowl, the water in the lower bowl is heated. A certain amount of steam will be generated in the lower bowl and the upward pressure of this steam tends to push the flange 8 upwardly and pivotally about the rim 14 of lower bowl 1. However, this upward pressure will serve to make the lip 9 of the flange 8 grip the rim even more tightly than before.

At the latter part of the coffee-making cycle, when the liquid in the lower bowl has substantially all passed to the upper bowl, and the remaining steam in the lower bowl starts to condense, a vacuum is created in the lower bowl, which, as is well known, causes the coffee to discharge back into the lower bowl. This vacuum also has the effect of causing the flange 8 of the sealing ring to flex toward the lower bowl, to a position such as is shown in Fig. 3. This downward flexing of the flange 8 disengages the lip 9 of the flange from the outer rim 14 of lower bowl 1. However, a seal is still maintained between the upper and lower bowls, due to the fact that the flexing of the flange 8 causes the torus 7 of the sealing ring to engage the well formed between the reentrant bead 13 of the upper bowl 2, and the interior surface of the rim 14 of the lower bowl 1. Due to this downward flexing of the flange 8, as just described, the upper bowl may be easily removed when the coffee-making process is finished, by simply lifting the upper bowl and the attached sealing ring 5 off of lower bowl 1. This easy removal results from the fact that the annular body portion 7 of the sealing member engages the adjacent surface of the lower bowl over a relatively small area so that the friction between the parts resisting removal is not great; and in addition the body portion 7 which is tight in re-entrant bead 13 rests on the outwardly flaring upwardly facing surface of rim 14 rather than being wedged between vertically extending parallel surfaces.

In Fig. 5, there is shown a modified form of my invention comprising a sealing ring 15 which is basically the same as that shown in Figs. 1–4, but differs principally in the outer flange construction. As will be seen from the drawing, the sealing ring 15 is comprised of a radially inner and a radially outer annular member, such as a radially inner torus 16 and a radially outer torus 17 of resilient material joined by an integral resilient flange 18.

There is shown in Fig. 6 a view of the sealing ring 15 of Fig. 5 in sealing position between upper and lower bowls 1 and 2. The inner diameter of torus 16 is less than the diameter of the upper bowl at the point where the torus is positioned. As a result, the torus 16 must be stretched into position onto the upper bowl. In the sealed position shown, the outer torus 17 engages the outside edge of the rim 14. The flange 18 assumes a conical shape with the cone pointing either inwardly and upwardly, as in Fig. 6, or inwardly and downwardly. This is due to the fact that while the internal diameter of the ring or torus is less than the diameter of the upper bowl at the point where the sealing ring is positioned, which necessitates stretching the torus in order to position it on the upper bowl, yet the outer torus 17 remains at the same diameter. As a result, the connecting flange 18 is flexed into a conical shape, either pointing upwardly or downwardly. The sealing ring 15 functions substantially the same as the sealing ring 5, and maintains the upper and lower bowls concentrically aligned. It is also easy to position and remove, and permits easy separation of the upper and lower bowls.

While I have shown particular embodiments of my invention, it will be understood, of course, that I do not wish to be limited thereto, since many modifications may be made, and I, therefore, contemplate by the appended claim to cover any such modifications as fall within the true spirit and scope of my invention.

What I claim as new and desire to secure by Letters Patent of the United States is:

1. In a coffee maker, a lower bowl having an upwardly and outwardly tapered wall which defines a top opening, an upper bowl having a downwardly and inwardly tapered wall at its lower end of a diameter less than said top opening shaped to define an annular re-entrant bead spaced upwardly from the lower end of said upper bowl, and a sealing ring of resilient material for sealing the space between said outwardly tapered wall and said downwardly and inwardly tapered wall when said walls are positioned in spaced relation relatively to each other comprising an annular body ring circular in cross section and of a diameter less than that of said re-entrant bead, an annular radially extending web section surrounding and integral with said body ring of a radial length sufficient to extend across the space between said walls, and an annular lip integral with the outer edge of said web section, said annular body ring being positioned in said re-entrant bead whereby it is under tension and having a cross-sectional diameter such that it projects beyond the confines of said re-entrant bead to form an annular seat surrounding the inwardly tapered wall of said upper bowl, and said web being thereby stressed to cause it to assume a conical shape to bring said annular lip into sealing engagement with the top edge of said upwardly and outwardly tapered wall when said web is deflected downwardly with respect to said body ring and to permit said body ring to engage said upwardly and outwardly flared wall when said web is deflected upwardly with respect to said body ring and said annular seat on said body ring to rest against the upwardly and outwardly tapered wall which forms the top opening of said lower bowl.

WALTER R. WEEKS.

References Cited in the file of this patent

UNITED STATES PATENTS

| Number | Name | Date |
|---|---|---|
| 1,814,678 | Ferguson | July 14, 1931 |
| 2,015,983 | Wolcott | Oct. 1, 1935 |
| 2,086,357 | Farber | July 6, 1937 |
| 2,223,450 | Jepson et al. | Dec. 3, 1940 |
| 2,367,409 | Kuhler | Jan. 16, 1945 |
| 2,392,656 | Foster | Jan. 8, 1946 |
| 2,571,015 | Columbus | Oct. 9, 1951 |
| 2,599,812 | Cronholm | June 10, 1952 |